(12) United States Patent
Ray et al.

(10) Patent No.: US 6,725,992 B1
(45) Date of Patent: Apr. 27, 2004

(54) ELECTROMAGNETIC CLUTCH CONTROL PROVIDING ENHANCED ENGAGEMENT

(75) Inventors: E. David Ray, White Lake, MI (US); Fredric H. Tubbs, Grand Blanc, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/303,599

(22) Filed: Nov. 25, 2002

(51) Int. Cl.[7] .................. F16D 27/115; F16D 27/14; F16D 27/00
(52) U.S. Cl. ............... 192/84.91; 192/84.1; 192/84.7
(58) Field of Search .............. 192/84.1, 35, 13 R, 192/84.7, 84.91; 331/78

(56) References Cited

U.S. PATENT DOCUMENTS

| | | |
|---|---|---|
| 5,379,217 A | 1/1995 | Mimura |
| 5,407,024 A | 4/1995 | Watson et al. |
| 5,704,444 A | 1/1998 | Showalter |
| 5,771,477 A * | 6/1998 | Showalter et al. ............ 701/51 |
| 6,099,086 A * | 8/2000 | Feigel et al. ............. 303/113.4 |
| 6,105,702 A | 8/2000 | Showalter |

* cited by examiner

*Primary Examiner*—Rodney H. Bonck
(74) *Attorney, Agent, or Firm*—Brinks Hofer Gilson & Lione; Greg Dziegielewski

(57) ABSTRACT

Engagement characteristics of electromagnetic friction clutch pack assemblies disposed in, for example, motor vehicle transfer cases are improved, especially at the transition between static and dynamic friction modes, by superimposing a random noise signal on an otherwise smooth analog or stepped digital signal. The controller and driver for the clutch includes a random noise (signal) generator having an output which is superimposed on the controller output generated in response to signals from various sensors disposed on the vehicle. When the controller inputs cause clutch engagement in accordance with the controller software, an engagement signal comprising both a drive portion and a smaller random noise portion is supplied to the electromagnetic clutch operator. Improved, less perceptible clutch engagement action is thereby achieved.

20 Claims, 3 Drawing Sheets

ELECTROMAGNETIC CLUTCH CONTROL PROVIDING ENHANCED ENGAGEMENT

BACKGROUND OF THE INVENTION

The invention relates generally to a control method and apparatus for electromagnetic clutches and more specifically to a control method and apparatus wherein a random noise signal is superimposed upon a clutch engagement signal to provide improved engagement characteristics of the electromagnetic clutch.

Amongst motor vehicle manufacturers, two areas of vehicle performance are foci of constant study, engineering design and product improvement. These two areas can broadly be denominated vehicle operation and occupant comfort. Occupant comfort typically includes seating and other tactile and aesthetic considerations but also encompasses aspects of vehicle operation. Within the context of operation occupant comfort generally addresses noise, vibration and harshness (NVH) issues. These design criteria are nowhere more subjects of concern than in adaptive four-wheel drive vehicles where the complex power train, torque distribution configuration, control strategy and overall system operation create their own performance and control issues.

In adaptive four-wheel drive systems which operate under most driving conditions as two-wheel drive systems and automatically shift or select four-wheel drive when certain operating conditions such as wheel slip or other operating anomalies are sensed, the engagement of a clutch between the full-time or primary drive line and the part-time or secondary drive line to transfer drive energy to the secondary drive line must be both carefully controlled and preferably unnoticeable to the vehicle driver. Competing with this design goal of transparent and smooth clutch engagement is often the design preference to engage the clutch as quickly as possible in order to achieve vehicle control and slip regulation.

Furthermore, as the clutch engages and the coefficient of friction of the interleaved plates changes between static and dynamic values and operating modes, its torque throughput will be non-linear, i.e., not directly related to clutch coil current. Nonetheless, mechanical performance of a clutch must be smooth, well-modulated and without grabbing or other engagement phenomena which may be sensed by the vehicle driver or occupants. The present invention is directed to a control method and apparatus which improves engagement smoothness and overall performance of friction clutch packs in motor vehicle drive lines.

SUMMARY OF THE INVENTION

Engagement characteristics of the electromagnetic friction clutch pack assemblies disposed in, for example, motor vehicle transfer cases are improved, especially at the transition between static and dynamic friction modes, by superimposing a random noise signal on an otherwise smooth analog, stepped, incremental or digital signal. The controller and driver for the clutch includes a random noise (signal) generator having an output which is superimposed on the controller output generated in response to signals from various sensors disposed on the vehicle. When the controller inputs cause clutch engagement in accordance with the controller software, an engagement signal comprising both a drive portion and a smaller, random noise portion is supplied to the electromagnetic clutch operator. Improved, less perceptible clutch engagement action, especially at the transition between static and dynamic friction modes, is thereby achieved.

Thus it is an object of the present invention to provide a controller for an electromagnetic clutch having improved engagement characteristics.

It is a further object of the present invention to provide a method for controlling an electromagnetic clutch of a motor vehicle having improved engagement characteristics.

It is a still further object of the present invention to provide a method and apparatus for providing improved clutch engagement especially at the transition between static and dynamic friction modes.

It is a still further object of the present invention to provide a method of operating an electromagnetic clutch wherein a random noise signal is superimposed upon a control output thereby providing improved clutch engagement characteristics.

It is a still further object of the present invention to provide a controller for an electromagnetic clutch disposed in a transfer case or axle of a motor vehicle which provides a random noise signal superimposed upon a drive signal to improve clutch engagement characteristics.

Further objects and advantages of the present invention will become apparent by reference to the following description of the preferred embodiment and appended drawings wherein like reference numbers refer to the same component, element or feature.

DESCRIPTION OF THE PREFERRED EMBODIMENT

Figure 1:
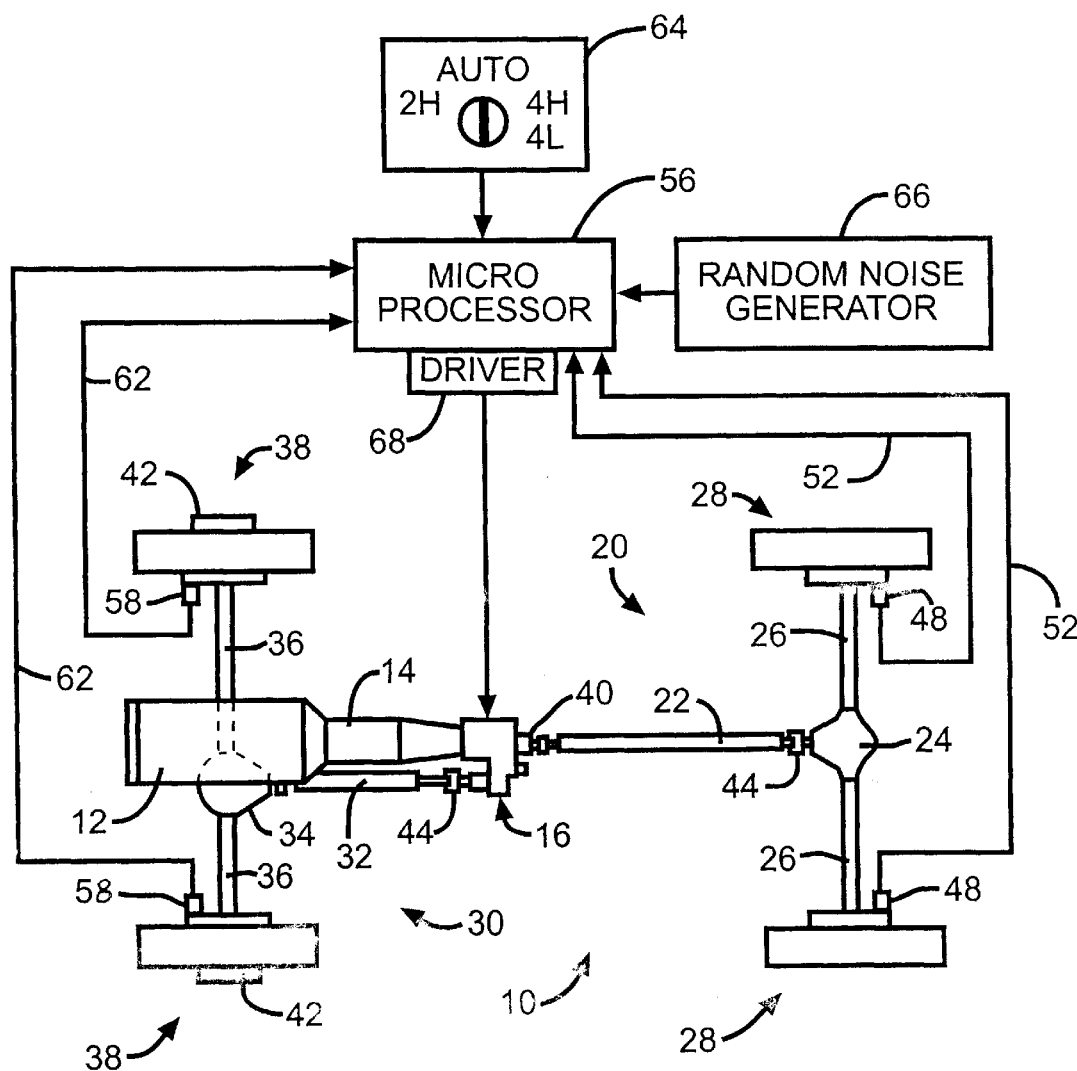
FIG. 1 is diagrammatic view of a drive assembly of a four wheel drive motor vehicle incorporating the present invention.

Referring now to FIG. 1, a four-wheel vehicle drive train which may utilize the present invention is diagramatically illustrated and designated by the reference number 10. The four-wheel vehicle drive train 10 includes a prime mover 12 which is coupled to and directly drives a transmission 14. The output of the transmission 14 directly drives a transfer case assembly 16 which provides motive power to a primary or rear drive driveline 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front driveline 30 comprising a secondary or front prop shaft 32, a secondary or front differential 34, a pair of live secondary or front axles 36 and a respective pair of secondary or front tire and wheel assemblies 38. The front tire and wheel assemblies 38 may be directly coupled to a respective one of the front axles 36 or, if desired, a pair of manually or remotely activatable locking hubs 42 may be operably disposed between the front axles 36 and a respective one of the tire and wheel assemblies 38 to selectively connect same. Finally, both the primary driveline 20 and the secondary driveline 30 may include suitable and appropriately disposed universal joints 44 which function in conventional fashion to allow static and dynamic offsets and misalignments between the various shafts and components.

Disposed in sensing relationship with each of the rear tire and wheel assemblies 28 is a wheel speed sensor 48. Preferably, the wheel speed sensors 48 may be the same sensors utilized with, for example, an antilock brake system (ABS) or other vehicle control or traction enhancing system. Alternatively, a single sensor, disposed to sense rotation of the primary or rear prop shaft 22 may be utilized. Signals from the sensors 48 are provided in lines 52 to a microprocessor 56. Similarly, disposed in sensing relationship with the front tire and wheel assemblies 38 are respective wheel speed sensors 58 which provide signals to the microprocessor 56 in lines 62. Once again, the sensors 58 may be a part of or shared with an antilock brake system or other traction control system.

Typically an operator selectable switch 64 may be utilized and is generally disposed within reach of the vehicle operator in the passenger compartment (not illustrated). The switch 64 may be adjusted to select various operating modes such as two-wheel high gear, automatic, i.e., on-demand or adaptive operation, four-wheel high gear or four-wheel low gear depending upon the particular vehicle and configuration of the transfer case assembly 16. One such system which provides torque delivery to the secondary driveline 30 in increments or decrements in response to a sensed wheel speed difference between the primary driveline 20 and the secondary driveline 30 is disclosed in U.S. Pat. No. 5,407,024.

Also providing a signal to the microprocessor 56 is a random noise (signal) generator 66. The random noise generator 66 provides a signal which varies randomly over time and which is used, as described below, to enhance operational characteristics of the transfer case assembly 16 and four-wheel vehicle drive train 10. Typically, the output of the microprocessor 56 is a control signal which is delivered to a driver assembly 68 which increases the current flow of the output of the microprocessor 56 to a level sufficient to drive an electromagnetic clutch.

Figure 2:
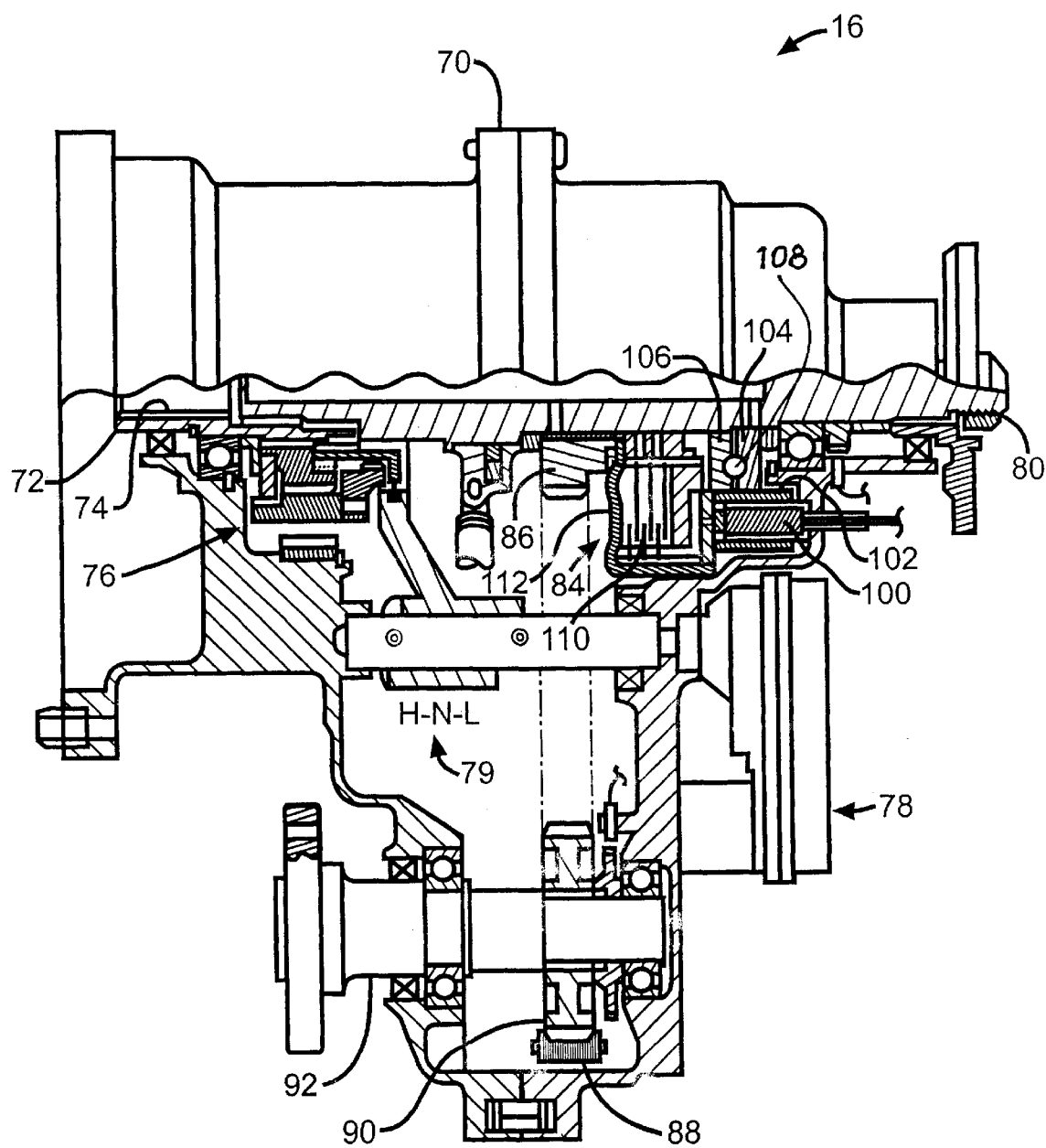
FIG. 2 is a side elevational view, in partial section of a transfer case having an electromagnetic friction clutch assembly adapted to be driven by a controller according to the present invention.

Referring now to FIG. 2, a typical two-speed transfer case assembly 16 includes a multiple piece housing 70 having a plurality of planar sealing surfaces, openings for shafts and bearings and various recesses, shoulders, counterbores and the like which receive various components or assemblies of the transfer case assembly 16. An input shaft 72 includes female or internal splines 74 or other suitable coupling structures which drivingly engage and couple the output of the transmission 14 illustrated in FIG. 1 to the input shaft 72. In the two-speed transfer case assembly 16, the input shaft 72 provides motive power to a planetary gear speed reduction assembly 76 which is controlled by a two or three position operator assembly 78 and shift fork and cam assembly 79 to achieve and provide a first, direct drive speed range (high gear), neutral and a second, reduced speed drive range (low gear). The output of the planetary gear speed reduction assembly 76 is provided to a primary output shaft 80 which is coupled to, and drives the primary driveline 20. In a single speed transfer case assembly, the planetary gear assembly 76 and the operator assembly 78 are not present and the input shaft 72 or its equivalent directly drives the primary output shaft 80.

A modulating clutch assembly 84 is operably disposed between the primary output shaft 80 and a chain drive sprocket 86 freely rotatably disposed about the primary output shaft 80. The chain drive sprocket 86 is engaged by a drive chain 88 which also engages a driven chain sprocket 90 which is secured to a secondary output shaft 92. The secondary output shaft 92 is coupled to and drives the secondary driveline 30.

The modulating clutch 84 may be of any configuration utilizing an electromagnetic coil to cause motion of an associated device which results in compression of a friction clutch pack to a degree corresponding to the intensity of the drive signal to an electromagnetic coil. Thus, while the invention is described in conjunction with a clutch operator referred to as a ball ramp operator, direct acting coils and bidirectional drive motors driving the clutch through, for example, gear reductions, sector plates and cams as well as other actuator configurations are all considered to be within the purview of the present invention.

The modulating clutch 84 includes an electromagnetic coil 100 which is surrounded by a rotor 102 which is coupled to a first circular member 104. The first circular member 104 is disposed adjacent a second circular member 106. Adjacent, opposed circular members 104 and 106 include symmetrically configured ramped recesses which receive load transferring balls 108. In accordance with well known principles of operation, energization of the coil 100 creates drag in the rotor 102 and associated first circular member 104 causing relative rotation between the first and second circular members 104 and 106 and driving the second circular member 106 toward a friction clutch pack 110 which is thereby compressed. Drive torque is thus transferred from the primary output shaft 80 through the compressed, interleaved plates or discs of the friction clutch pack 110 to a bell housing 112 which is coupled to and drives the chain drive sprocket 86. Reduction of the energization of the coil 100 reduces the just described torque transfer.

Figure 3:
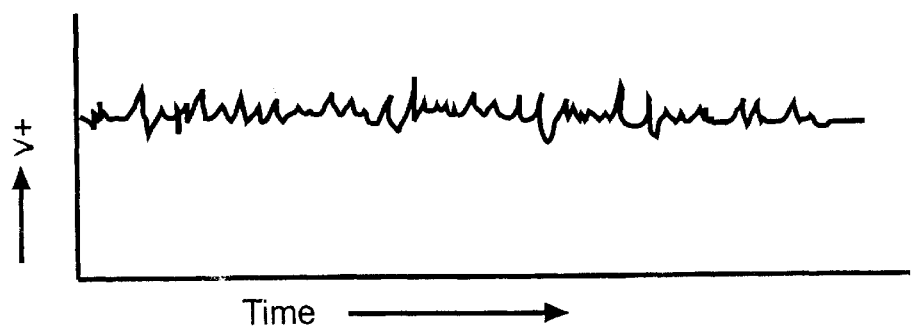
FIG. 3 is a graph illustrating a random noise signal produced by a generator according to the present invention.

Referring now to FIG. 3, a typical random noise signal is illustrated. The X-axis of FIG. 3 represents time and the Y-axis represents voltage or intensity. The random noise signal illustrated represents the output of the random noise generator 66 which is provided to the microprocessor 56. Any one of numerous random noise generation techniques and components may be utilized. For example, a zener diode or an integrated circuit such as the LM 336 which can simulate the operation of a zener diode as well as numerous other random noise generators which are well known to those skilled in the art are wholly suitable in this application. Furthermore, while a pink noise signal is preferable, either white noise, pink noise or other random noise signal may be generated and used in the present invention. The output signal from the random noise generator 66 is combined with the drive signal generated by the microprocessor 56 and is provided to the driver circuitry 68 which increases the current and voltage of the logic signals utilized in the microprocessor 66 to levels which are suitable for operation of the electromagnetic coil 100.

Figure 4:
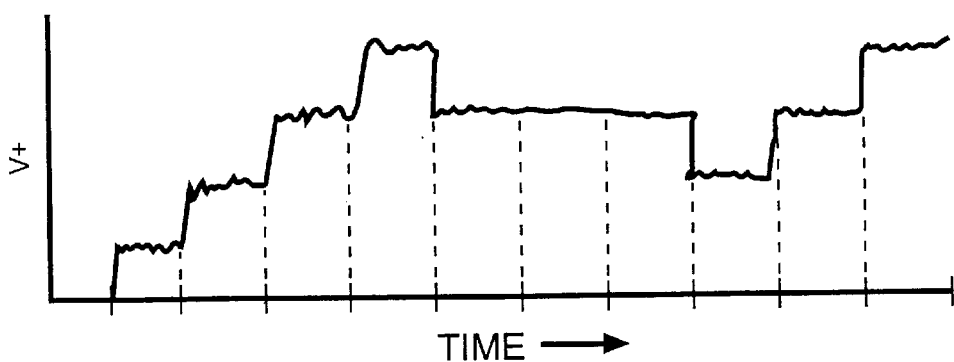
FIG. 4 is a graph illustrating the random noise signal according to the present invention superimposed upon an incremental (step-wise) clutch control signal of a clutch drive circuit.

Referring now to FIG. 4, a digital, stepwise or incremental output control signal from the microprocessor 56 having a random noise signal from the random noise generator 66 superimposed thereupon is illustrated. The steps may be very small but are preferably on the order of 5% to 10% of maximum clutch engagement and are between 5 and 100 milliseconds duration and preferably between 10 to 50 milliseconds.

Figure 5:
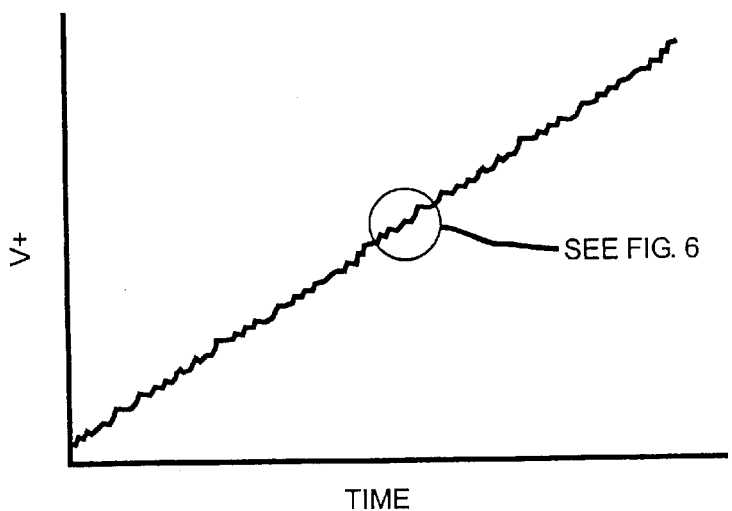
FIG. 5 is a graph illustrating the random noise signal superimposed upon an analog clutch control signal.
Figure 6:
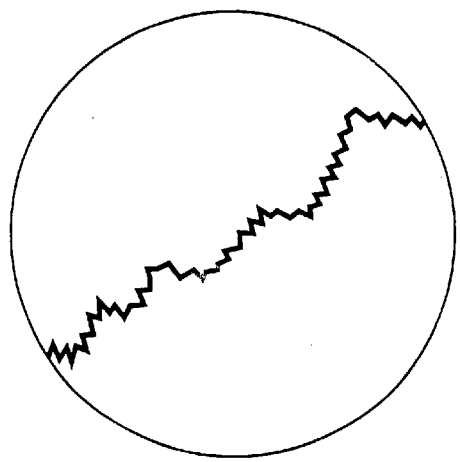
FIG. 6 is a greatly enlarged portion of the random noise signal signal generator and controller according to the present invention.

Similarly, in FIG. 5, an analog control signal output from the microprocessor 56 having a random noise signal superimposed thereupon is illustrated. It will be appreciated that regardless of the character of the output signal (digital, incremental or analog) of the microprocessor 56 and driver 68, random noise may be superimposed thereupon in accordance with the present invention.

The absolute value or proportion of the random noise signal from the random noise generator 66 to the voltage output of the microprocessor 56 and driver 68 is preferaby empiricly or experimentally determined through performance testing of the particular vehicle. This is so because the purpose of addition of the random noise signal is to match or compensate for other random variables, primarily within the clutch and the vehicle driveline, and thereby cancel or minimize them as described below. As FIGS. 4 and 5 illustrate, quantitatively the random noise signal is a small fraction or percentage of the magnitude of the overall control signal.

While the theory of operation of the apparatus and method disclosed herein is not fully understood, it is believed to reside in the combination of the small, random noise variations and a defined clutch operation profile which thereby tend to cancel out or mask mechanical variables in the system.

As an example, envision a vehicle being operated at a constant speed with no internal, driver inputs or adjustments such as speed or steering variations and no external inputs such as road grade variations or winds affecting the operation of the vehicle. That is, it is operating at a steady state. Under this condition any, even small, variations in operation may be detected as an upset or perturbation to the steady state (and its accompanying sounds and perceptions) the driver and passengers have at least temporarily become accustomed to.

Engagement of a clutch in such circumstances will result in a change of the steady state in correlation to the degree or extent of clutch engagement. If clutch engagement is a large, rather abrupt step, it will likely be readily apparent. But any engagement, if it is rapid enough to achieve an anti-skid or traction assist function, will upset the established steady state and therefore likely be noticeable to some extent.

The addition of random noise to the clutch engagement program partially masks, by its randomness, the engagement program, rendering detection of a change in the operating state of the vehicle more difficult.

It has also been posited that the random noise masks, randomly cancels or compensates for other random operating variables in the mechanical components of the drive system such as the clutch actuator, chain and gear noise, universal joint rotational variations and noise rendering clutch operation less detectible. This is especially true during the portion of clutch engagement wherein the coefficient of friction between the clutch plates shifts from a static coefficient to a dynamic coefficient.

Although disclosed in conjunction with an electromagnetic ball ramp clutch actuator, it should be readily apparent that the invention relates to modifying the engagement program or profile of a friction clutch, by the addition of random noise, not to engagement of a particular type of clutch. Thus, the present invention is wholly usable with any and all electrically engageable clutches in motor vehicle power trains which, for example, may utilize direct acting coils, linear motors, bi-directional motors driving clutches through gears, cams or sector plates, as the advantages of the present invention will be equally applicable and beneficial.

The foregoing disclosure is the best mode devised by the inventors for practicing this invention. It is apparent, however, that products and methods incorporating modifications and variations will be obvious to one skilled in the art of truck beds, bed liners and manufacturing processes therefor. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

We claim:

1. A clutch system having improved engagement characteristics comprising, in combination:
    a microprocessor for receiving signals from vehicle sensors and providing a clutch engagement signal;
    a random noise generator providing a random noise signal;
    a friction clutch pack having an input and an output; and
    an electromagnetic operator for receiving said clutch engagement and said random noise signals and engaging said friction clutch pack.

2. The clutch system of claim 1 further including a driver assembly for amplifying said clutch engagement and said random noise signals.

3. The clutch system of claim 1 wherein said friction clutch pack is a modulating clutch.

4. The clutch system of claim 1 wherein said microprocessor provides an incremental clutch engagement signal.

5. The clutch system of claim 1 wherein said microprocessor provides an analog clutch engagement signal.

6. The clutch system of claim 1 further including a transfer case having a primary output and a second output and wherein said input and said output of said friction clutch pack are coupled to said primary output and said secondary output of said transfer case, respectively.

7. The clutch system of claim 1 wherein said random noise signal is selected from the group consisting of white noise and pink noise.

8. A clutch system for a motor vehicle having improved engagement characteristics comprising, in combination:
    microprocessor means for receiving signals from at least one vehicle sensor and providing a clutch engagement signal;
    means for generating a random noise signal;
    clutch means having an input and an output; and
    electromagnetic means for receiving said signals from said microprocessor and said random noise generating means and engaging and disengaging said clutch means.

9. The clutch system of claim 8 further including a driver assembly for amplifying said clutch engagement and said random noise signals.

10. The clutch system of claim 8 wherein said clutch means is a modulating friction pack clutch.

11. The clutch system of claim 8 wherein said microprocessor means provides an incremental clutch engagement signal.

12. The clutch system of claim 8 wherein said microprocessor means provides an analog clutch engagement signal.

13. The clutch system of claim 8 wherein said random noise signal is selected from the group consisting of white noise and pink noise.

14. The clutch system of claim 8 further including a transfer case having a primary output and a second output and wherein said input and said output of said friction clutch pack are coupled to said primary output and said secondary output of said transfer case, respectively.

15. A method of providing improved engagement of an electromagnetically operated clutch comprising the steps of:

provide a clutch engagement signal;

providing a random noise signal;

combining said clutch engagement signal and said random noise signal; and providing said clutch engagement and random noise signals to an electromagnetic operator of a friction clutch.

16. The method of claim 15 further including the step of providing a vehicle sensor output signal.

17. The method of claim 15 further including the step of amplifying said clutch engagement signal and said random noise signal.

18. The method of claim 15 wherein said clutch engagement signal is an incremental signal.

19. The method of claim 15 wherein said clutch engagement signal is an analog signal.

20. The method of claim 15 wherein said random noise signal is selected from the group consisting of white noise and pink noise.

* * * * *